(12) United States Patent
Rose et al.

(10) Patent No.: US 6,701,830 B2
(45) Date of Patent: Mar. 9, 2004

(54) CHEESE BRINING APPARATUS

(76) Inventors: Scott J. Rose, 431 Fountain St., Columbus, WI (US) 53925; James L. Karpinsky, W7698 Phillips Rd., Poynette, WI (US) 53955

( * ) Notice: Subject to any disclaimer, the term of this patent is extended or adjusted under 35 U.S.C. 154(b) by 6 days.

(21) Appl. No.: 10/100,264

(22) Filed: Mar. 18, 2002

(65) Prior Publication Data

US 2003/0070561 A1 Apr. 17, 2003

Related U.S. Application Data

(63) Continuation-in-part of application No. 09/981,640, filed on Oct. 17, 2001.

(51) Int. Cl.$^7$ .......................... B65G 49/00; A23C 19/14
(52) U.S. Cl. .......................... 99/535; 99/443 C; 99/455; 99/517
(58) Field of Search .......................... 99/535, 455, 452, 99/517, 516, 443 C, 443 R

(56) References Cited

U.S. PATENT DOCUMENTS

| | | |
|---|---|---|
| 1,339,212 A | 5/1920 | Mackenrot |
| 1,924,271 A | 8/1933 | Chapman |
| 1,940,192 A | 12/1933 | Sorber |
| 2,196,643 A | 4/1940 | Reeh |
| 2,638,759 A | 5/1953 | Barris |
| 3,405,455 A | 10/1968 | Strong |
| 3,482,508 A | 12/1969 | Bajcar et al. |
| 3,493,093 A | 2/1970 | Hammer et al. |
| 3,713,850 A | 1/1973 | Gasbjerg |
| 3,779,034 A | 12/1973 | Morgan |
| 3,824,918 A | 7/1974 | Bronkhorst |
| 3,910,174 A | 10/1975 | Nelles |
| 3,923,071 A | 12/1975 | Lada |
| 4,068,014 A | 1/1978 | Heimbruch |
| 4,108,056 A | 8/1978 | Van Elten et al. |
| 4,206,238 A | 6/1980 | Rothenbuhler |
| 4,815,368 A | 3/1989 | Nelles |
| 4,820,540 A | 4/1989 | Budahn |
| 4,869,161 A | 9/1989 | LaCount |
| 4,902,523 A | 2/1990 | Fritchen et al. |
| 5,018,440 A | 5/1991 | Johnson |
| 5,195,426 A | 3/1993 | Thuli |
| 5,505,608 A | 4/1996 | Tomatis |
| 5,881,639 A | 3/1999 | Nesheim et al. |
| 6,379,734 B1 | 4/2002 | Abler |
| 6,393,976 B1 * | 5/2002 | Abler .......................... 99/455 |
| 6,458,397 B1 * | 10/2002 | Abler .......................... 99/535 X |

FOREIGN PATENT DOCUMENTS

EP 0 009 279 A1 2/1980

OTHER PUBLICATIONS

Wisconsin Professional Engineer, vol. 36, No. 5, Jul. 1995, pp. 1–2.
"Deep Pit Brining", Jake Nelles, Marschall Italian & Specialty Cheese Seminars, pp. 1–3.
Intralox Modular Plastic Coneyor Belts, Belt Selection Guide, ©2000 Intralox, Inc 14516–IN, pp. 1–31.
"Automatic Vertical Serpentine Brine System" CAD drawing, c. 1995.

* cited by examiner

*Primary Examiner*—Reginald L. Alexander
(74) *Attorney, Agent, or Firm*—Lathrop & Clark LLP

(57) ABSTRACT

Above-ground tanks form brining cells into which cheese blocks are conveyed by common inlet and outlet flumes. Each cell has a removable conveyor assembly having a looped link belt driven around a frame by a motor. Perpendicular, tubular, or hinged segmented flights project from the belt to engage infed cheese blocks, and submerge a series of rows of blocks. An infeed flume delivers a stream of cheese blocks to a cell. Once a level below a flight is filled, the conveyor is actuated to submerge that level, and the next level is then filled until the tank is filled. After brining, the conveyor is incremented to discharge the cheeses flight by flight into an outlet flume. The flume may have a lower segment narrower than an upper segment, such that by draining the tank smaller cheese blocks may be better controlled.

15 Claims, 8 Drawing Sheets

CHEESE BRINING APPARATUS

CROSS REFERENCES TO RELATED APPLICATIONS

This application is a continuation-in-part of U.S. application Ser. No. 09/981,640, filed Oct. 17, 2001, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to cheese brining apparatus in general, and in particular to automated cheese brining systems.

The production of many types of cheese requires that after the cheese blocks or loafs have been formed, they be exposed to a salt solution for a period of hours. This brining process has been practiced for centuries, sometimes on individual loafs, and in more recent times on large quantities of cheeses in batch or continuous processing apparatus.

In one widely used process, the molded cheese blocks, which usually have a density slightly less than the salt water in which they are floated, are advanced along brine filled flumes along a serpentine path. The submerged portions of the cheeses are thus exposed to brine, while the portions of the cheese which float above the fluid are subjected to a continuous spray of brine. One drawback to the use of brine sprays is the wide dispersion of the corrosive saltwater throughout the plant environment, imposing significant cleaning burdens, and creating a difficult work environment. In addition, to provide for a smooth flow of the blocks, a generous quantity of brine is required, imposing additional space and brine processing demands.

Another common process advances the cheese blocks from the flume into a rack composed of multiple stacked porous shelves. The rack is suspended over a brine tank and positioned with the lowermost shelf to receive a series of cheeses. As each shelf is filled, the rack is indexed downward to receive additional cheese blocks, until all the shelves have been filled, at which point the rack is entirely submerged for a period of time until the desired brining has been achieved. The process is then reversed with the rack being elevated one shelf at a time until all the cheeses have been discharged. However, since the last cheeses loaded will be the first unloaded, this process does not yield complete uniformity of cheese residence time within the brine. Moreover, the rack systems are often raised and lowered by hydraulic actuators, which must be carefully maintained to avoid contamination of the food product.

Cheese is produced in a variety of sized blocks or loaves. Although many established facilities will be dedicated entirely to brining of cheese of only a certain controlled size. Facilities which serve a variety of markets may be called upon to handle the brining of cheeses of different sizes. However, brining facilities designed to handle larger cheese blocks, may provide space for small cheese blocks to be turned or to double up in the flumes or other flow passages, requiring time-consuming manual dislodgement.

What is needed is a compact and easily maintained cheese brining apparatus which facilitates uniform brining of the cheese. In addition, a system which is readily adaptable to different cheese block sizes is desirable.

SUMMARY OF THE INVENTION

The cheese brining apparatus of the present invention has a series of narrow and tall above-ground stainless steel tanks which define independent brining cells into which cheese blocks are floated by common inlet and outlet flumes. Each cell receives a conveyor assembly having a looped belt formed of plastic links which is driven around a frame by an attached electric motor. The belt has evenly spaced outwardly protruding plastic flights. The infeed flume delivers a stream of cheese blocks to a cell. Once the entire length of a flight is filled, the belt is advanced one increment such that a belt flight engages the array of cheese blocks, causing them to submerge within the brine contained in the cell. The cell then receives another row of cheese blocks, and is again incremented, until all the submerged flights engage cheese blocks. The belt has a downward run which joins an upward run, such that the two runs diverge as the loop extends upwardly. The flights, which are approximately perpendicular to the belt itself, are thus always inclined downwardly, helping to retain the cheese blocks between the flight and the main body of the belt. The conveyor is halted once the cell is fully loaded, and gates are operated in the infeed flume to direct subsequent cheese blocks to another cell. After the desired residence time of a load of cheese blocks within a cell, the cell is opened to the outlet flume, a brine current is introduced and the conveyor is operated to successively bring each row of cheese blocks into position to be discharged. The flights may be perpendicular projections, cylindrical tubes, or hinged assemblies of two segments to accommodate different size blocks of cheese. To enable the system to better control cheese blocks of different size under automation, the brine flumes may be formed with a lower segment which is of a smaller width than the upper segment. When the flumes are filled to a first level the flume is wider than a large block of cheese, but not so large that two blocks can fit abreast or become jammed. By draining the brine to a second, lower level, the width of the active channel is narrowed, and smaller cheese blocks may in a like manner be controlled automatically.

It is an object of the present invention to provide a cheese brining system in which the first cheese blocks into the brine tank are also the first cheese blocks out of the brine tank.

It is also an object of the present invention to provide a cheese brining system which permits segregation of treatment of cheese blocks.

It is another object of the present invention to provide a cheese brining system which permits tracking of individual cheese blocks.

It is a further object of the present invention to provide a cheese brining system which may be entirely automated, and may be adapted for different sizes of cheese blocks.

It is yet another object of the present invention to provide a cheese brining system requiring reduced quantities of brine.

It is a further object of the present invention to provide a cheese brining system which reduces opportunities for foreign material to enter the brine.

It is a still further object of the present invention to provide a cheese brining system with high densities of cheese blocks.

Further objects, features and advantages of the invention will be apparent from the following detailed description when taken in conjunction with the accompanying drawings.

DESCRIPTION OF THE PREFERRED EMBODIMENTS

Figure 1:
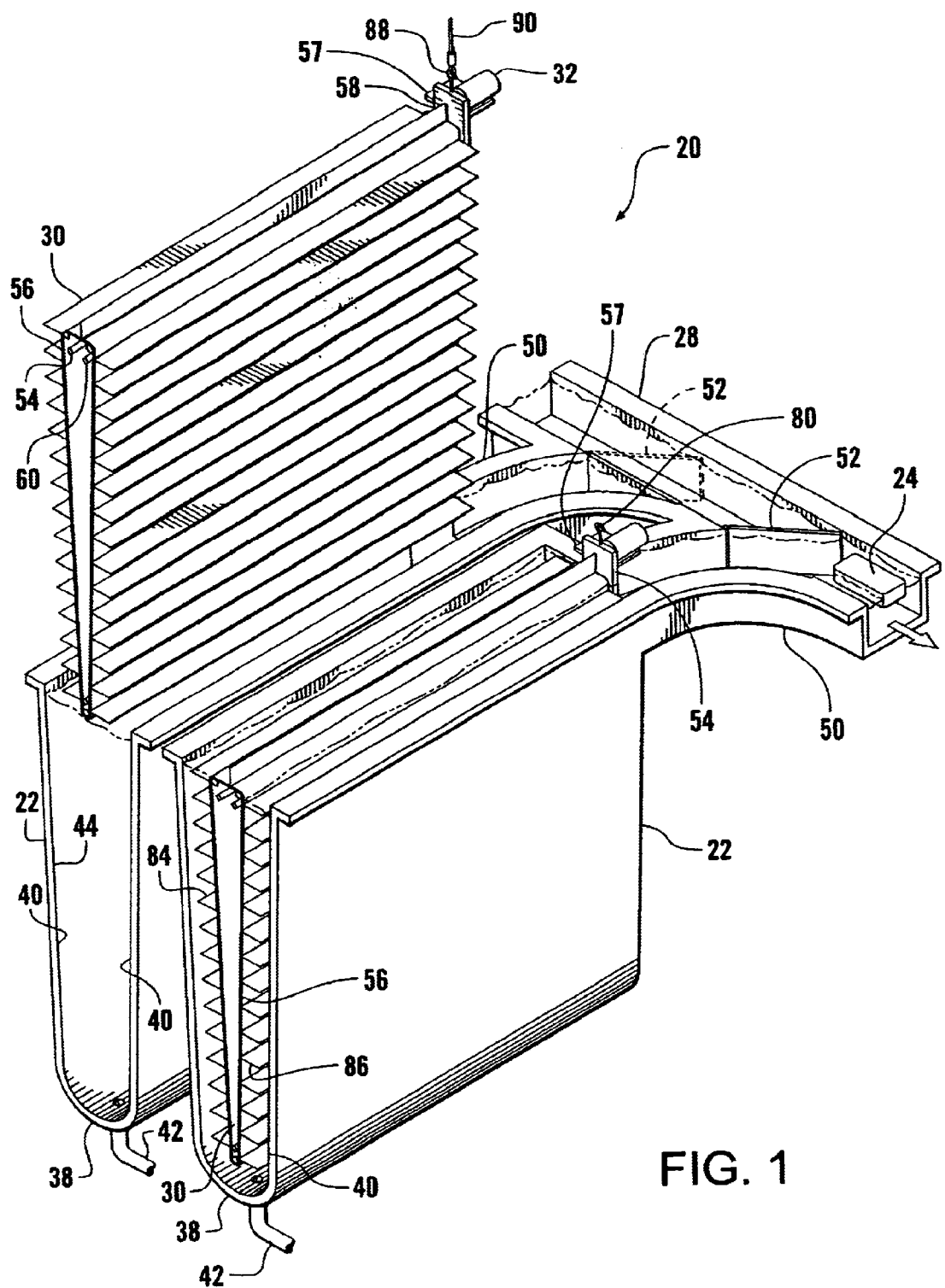
FIG. 1 is a fragmentary isometric view of the conveyorized cheese brining system of this invention, showing one conveyor assembly being removed from a brine tank for service.
Figure 2:
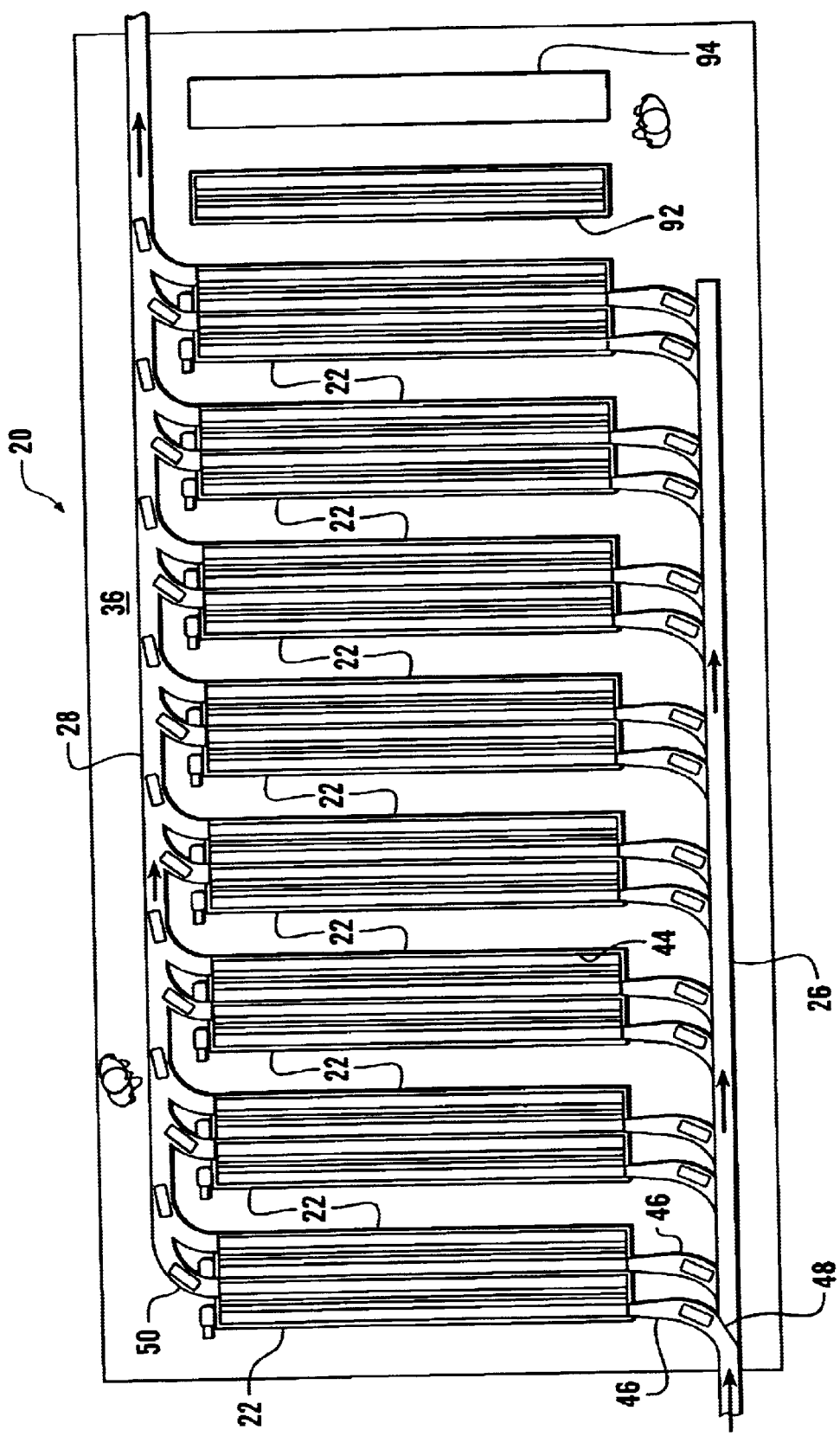
FIG. 2 is a top plan view of the conveyorized cheese brining system of FIG. 1.

Referring more particularly to FIGS. 1–8, wherein like numbers refer to similar parts, the conveyorized cheese brining system 20 of this invention is shown generally in FIG. 2. The system 20 has a sequence of aboveground brine tanks 22 which receive cheese blocks 24 from a common inlet flume 26 and which discharge the cheese blocks after brining to a common outlet flume 28. Each brine tank 22 has a conveyor assembly 30 which operates independently of the other conveyor assemblies and which is driven by its own electric drive 32.

Figure 3:
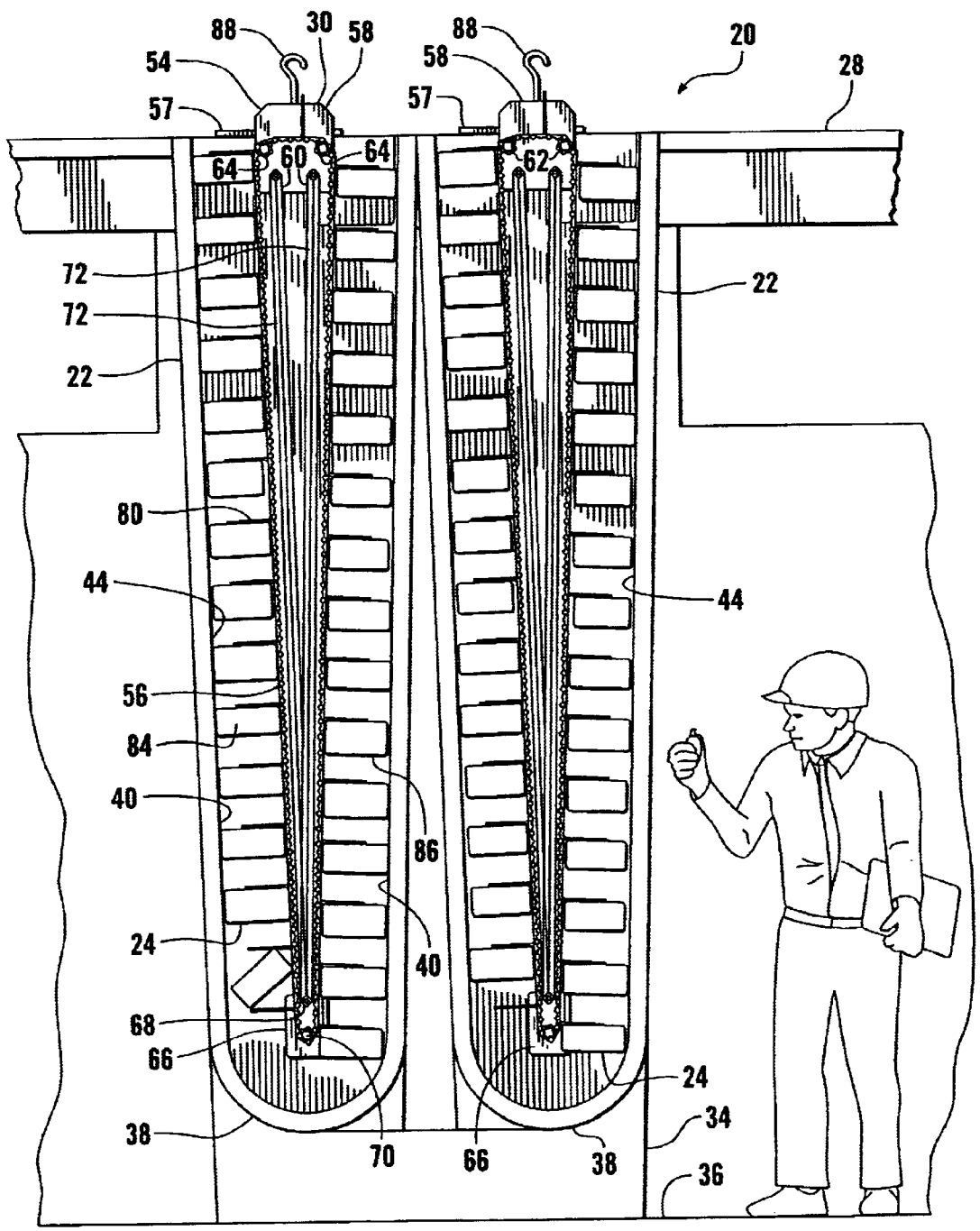
FIG. 3 is a cross-sectional view of two brine tanks of the system of FIG. 2 taken along section line 3—3.

As shown in FIG. 1, the brine tanks 22 are preferably positioned side-by-side in pairs and are supported by a support structure 34, shown schematically in FIG. 3, on the factory floor 36. The dimensions of the assembly 20 described hereafter are for purposes of example, although it should be noted that installations of varying sizes and capacities may be formed depending upon the requirements of the particular cheese production facility. The brine tanks 22 have a semicylindrical bottom wall 38 with two upwardly extending side walls 40 which diverge as they extend upwardly to an opening of about 32 inches. The side walls 40 are preferably formed of T316 stainless steel. The side walls 40 will typically be reinforced with exterior bars or trusses, not shown, and may be insulated. The tanks may extend to about 12 feet above the factory floor 36. The pairs of brine tanks 22 are preferably spaced about two feet apart to permit ready access to the tank exteriors for inspection, cleaning, and maintenance. Catwalks, not shown, are preferably supported between the tops of the tanks 22 to permit ready access to the tank interiors from above. The brine tanks 22 are preferably located in a sump type set up, that is, they are erected within a below grade excavated structure, but are not themselves submerged directly in the ground. This arrangement provides comfortable working and viewing height from the main floor. In addition, the sump configuration allows available ceiling height in the room to be used for an overhead crane 90, described below.

Each tank 22 has a drain pipe 42, as shown in FIG. 1, and is provided with brine supply piping, not shown, which provides a motive force for discharging cheese blocks 24 as described more fully below. Each tank 22 receives a conveyor assembly 30 and, when filled with brine, defines a single cell 44 in the assembly 20. As shown in FIG. 2 the common inlet flume 26 and common outlet flume 28 are parallel to one another, with the brine tanks 22 positioned between the two flumes, and generally perpendicular to the flumes. As shown in FIG. 1, the flumes 26, 28 are connected to the individual brine tanks at the upper levels of the tanks. The inlet flume 26 has curving inlet segments 46 which connect the flume to each of the brine tanks 22 at fluid inlets. Each inlet segment 46 may be provided with a controllable inlet gate 48 for selectively introducing a flow of cheese blocks 24 into a particular tank 22. Similarly, outlet segments 50 extend from each brine tank 22 to the outlet flume 28 on an end opposite the inlet segments. The outlet segments 50 extend from fluid outlets in the tanks, and provide for the discharge of the cheese blocks. Outlet gates 52 may be provided in each outlet segment 50 for controlling discharge of cheese blocks 24 from the tanks 22. The inlet gates and outlet gates preferably are provided with pneumatic actuators which allow a controller, such as a PLC, to operate the gates to control the flow of cheese blocks. The flumes 26, 28, and inlet segments 46 and outlet segments 50 have a narrow design configuration to prohibit the turning of the blocks of cheese as they navigate the system. The blocks flow the sweet way, i.e., the long axis of each block is aligned with the direction of travel. Thus the width of the flumes 26, 28 is preferably less than the length of the cheese blocks to be handled by the system.

The conveyor assembly 30 is substantially submerged within the brine within a tank. As shown in FIG. 3, each conveyor assembly 30 has a stainless steel tubular frame 54 to which a continuous looped belt 56 is mounted. The frame has end flanges 57 which extend outwardly over the tank, and engage against the upper lip of the tank to support the conveyor assembly 30. The belt 56 may be a series 800 INTRALOX™ modular plastic belt having straight flights and EZ Clean sprockets available from Intralox, Inc., see www.intralox.com. The belt is preferably a flush grid type of the brine compatible variety. The frame 54 has upper end plates 58 on each end which are connected by upper struts 60 and which support two square axles 62 which turn in bearings, not shown. Sprockets 64 are fixed to the axles 62 along the length of the frame at regular intervals. One of the axles 62 is driven by an electric motor drive 32 which is mounted to the frame and which may extend exterior of the tank 22. And it should be noted that although two spaced axles and sprockets are illustrated, a single axle with larger sprockets may be substituted. Because the INTRALOX™ sprockets are available only with even numbers of sprocket teeth, if two upper axles are employed, an odd number of links 74 should extend between the sprockets on the two upper axles. The frame 54 has lower end plates 66 which are connected by a lower strut 68 and which support a lower axle 70 to which sprockets 64 are mounted corresponding to the positions of the upper sprockets. The upper struts 60 are connected by a vertical struts 72 to the lower strut 68.

Figure 4:
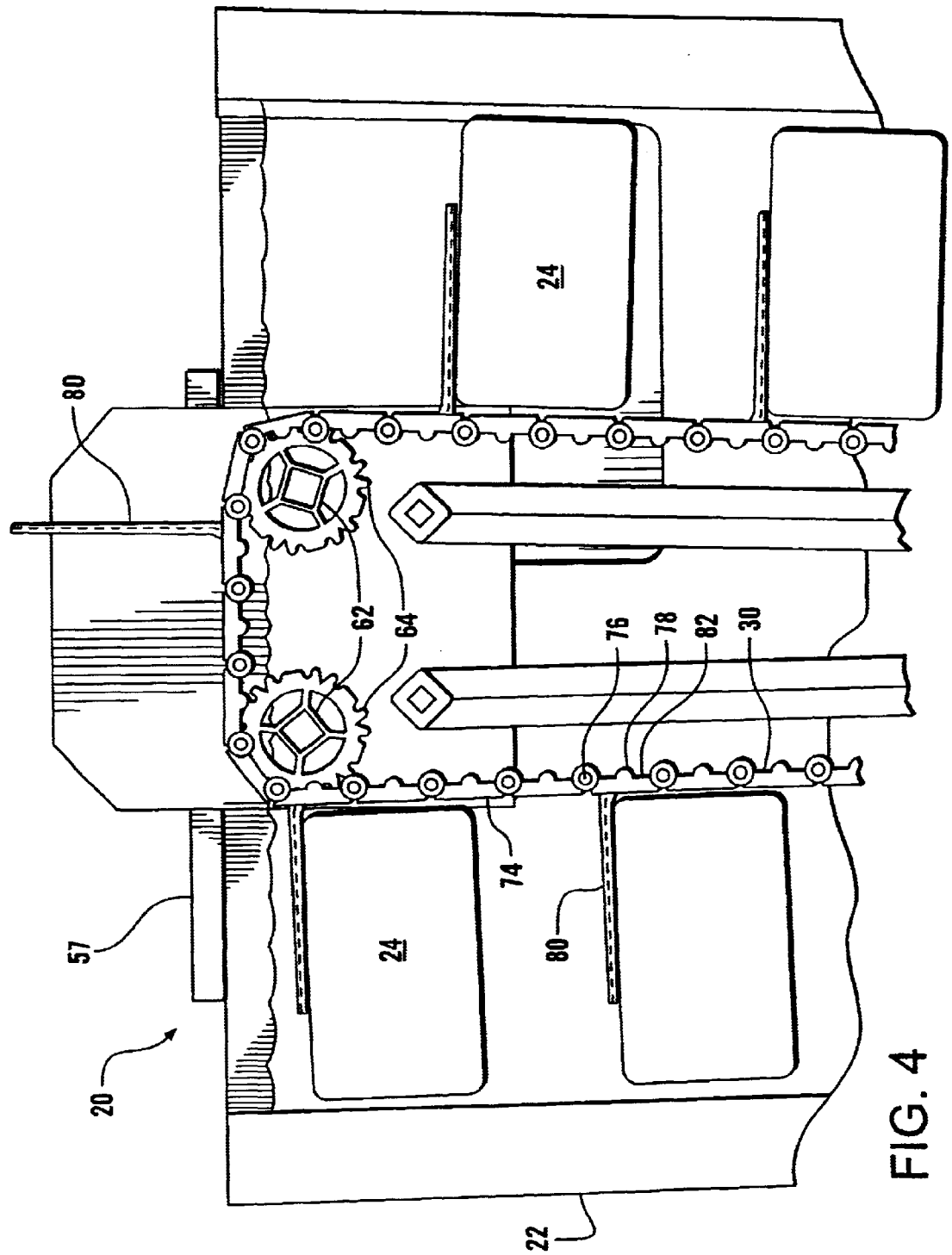
FIG. 4 is an enlarged fragmentary view of the conveyor assembly of FIG. 3.

As shown in FIG. 4, the modular belt 56 forms a continuous loop which is assembled from the modular plastic components. Each plastic component is formed of some food grade material such as polypropylene or nylon. The belt 56 has rigid plastic links 74 which are pivotably connected to one another at interdigitating hinged knuckles and secured with plastic pins 76. Flight links 78 are similar to the links 74, but have a plastic flight 80 which projects outwardly from the body 82 of the flight link 78. The flight 80 is a plastic barrier, shelf or protrusion, which extends approximately perpendicular to the body 82 of the flight link 78, and which serves both to separate one row of cheese blocks from another, and also to urge the blocks downwards along the downward run of the conveyor, and to resist the upward buoyant forces on the cheese blocks along the upward run of the conveyor. The frame 54 is contained within the belt 56 so that the flights always protrude outwardly away from the frame, with the flights being positioned between the belt and one or the other of the tank side walls. The flights 80 may project about 6–8 inches from the body 82, and are preferably provided with ribbed surfaces to minimize surface contact with the cheese blocks 24. The flight links are evenly spaced from one another, for example being connected by three standard links. The belt 56 has numerous molded perforations or openings that allow brine to flow around the backside of the cheese blocks. The flights 80 are fixed in orientation with respect to the link body 82 from which they extend. Thus, as a link travels from a position on the downward run 84 of the conveyor to a position on the upward run 86, the cheese blocks will not remain engaged by the same flight. A dedicated brine recirculation flow system with its own pump works to move fresh chilled brine through the brine cells. The flow of brine across the stationary cheese blocks enhances the heat rejection of the cheese. It should be noted that additional fittings or flow restriction panels could be incorporated in the tank walls and conveyor frame to create zoned cooling or brine densities within each tank.

As shown in FIG. 3, the conveyor assembly 30 defines a downward run 84 where the flights 80 are moved toward the tank bottom wall 38, and a subsequent upward run 86 where the flights 80 move away from the tank bottom wall. The downward run 84 of the belt converges towards the upward run 86 at the bottom of the tank 22. Because of this convergence, each run of the belt is inclined from the vertical about 4.5 degrees. However, this inclination could be greater depending on the type, size, and style of the cheese.

As a result, the plastic flights 80, which extend perpendicular to the belt, are all angled downwardly. This downward angling of the flights 80 helps to urge the cheese blocks toward the belt and keep the blocks from jamming against the tank side walls 40. As the belt progresses through the tank, the cheese blocks are restrained between the belt and one of the side walls. Because the belt loops around the frame, the cheese blocks are prevented from coming into contact with the frame. The operation of the conveyor assembly advances cheese blocks from the inlet of the tank to the outlet of the tank, over a circuitous route that passes beneath the conveyor assembly.

The cheese brining system 20 is installed as part of a cheese manufacturing facility, such as one for the production of mozzarella cheese. Cheese blocks 24 from the facility's molding system discharge conveyor are dropped into the high flow capacity common brine inlet flume 26 as best shown in FIG. 2. A flow rate sufficient to motivate the cheese blocks 24 is generated by a sanitary centrifugal pump, not shown.

The cheese blocks 24 may be of various sizes and weights, for example about 21 inches long, four inches tall, and 7½ inches wide. Such a block weighs about twenty pounds. A central controller, for example a PLC, not shown, controls the gates 48 with pneumatic actuators to divert the flow of cheese blocks into a designated cheese-brining cell 44. The PLC may be a conventional Allen Bradley industrial controls, and will be provided with sensors and view panels. All brine contact areas, plumbing, and pumps should be T316 stainless steel with a passivated finish.

A typical cheese brining system 20 may employ eight pairs of brine tanks 22 positioned parallel to one another. A row cavity for the reception of cheese blocks is defined between each pair of submerged belt flights 80. In the illustrated conveyor assemblies 30, each having thirty flights 80, twenty-nine submerged row cavities are defined. For 20 pound cheese blocks, twelve blocks are received within each row cavity. Hence, about 348 cheese blocks may undergo brining within each brine tank 22. Each tank 22 is filled with cheese blocks 24 one row cavity at a time. The belt 56 is advanced such that the topmost flight 80 is submerged within the brine within the tank below the level of the floating cheese blocks 24.

The cheese blocks 24 are then carried into the brine tank 22 above the submerged topmost flight 80 until such time as a full-load sensor determines that the maximum number of cheese blocks for that row cavity have entered. The full-load sensor may be a vision system, or an electric eye sensor detecting the passage of each cheese block into the tank, or an adjustable capacitance cell sensor which is able to detect the passage of a cheese block through the brine, and which permits the counting of cheese blocks entering the brine tank. Such sensors are described at http://www.ab.com/sensors/sensorstoday/capsensors.html and are available from Allen-Bradley.

A signal from the full-load sensor is conveyed to the controller indicating that a particular row cavity is filled. The controller then actuates the drive 32 to advance the belt to bring the next flight 80 down on top of the cheese blocks 24 and to submerge them within the tank 22. Once submerged, the cheese blocks 24 are trapped between the belt 56 on the inside, the side wall 40 on the outside, and a plastic flight 80 above and below. The advancement of the belt 56 to submerge the first row cavity opens up the surface of the tank to receive additional cheese blocks, and the loading is repeated until all the row cavities are filled.

When the conveyor assembly 30 is halted, the flights 80 on the downward run of the belt and the flights on the upward run 86 of the belt are each restraining an array of cheese blocks. It should be noted that the loads imposed on the belt are fairly low, because a typical cheese block is about 2 percent buoyant. Therefore, on the downward run the force required to submerge the blocks is a small fraction of the weight of the blocks, and on the upward run a similar small force is resisted by the flights. It will be noted that, as the belt turns around the lower axle 70, the cheese blocks move from being restrained on the underside of a downward run flight, to being restrained on the underside of an upward run flight, which was in its previous location the top side of a downward run flight.

Once the controller detects that a particular cell 44 is fully loaded, the inlet gate into that brine tank 22 is closed and the subsequent incoming cheese blocks from the molder are diverted to the next available cheese-brining cell. The loading sequence is repeated until all available cells 44 are filled. Once the cheese blocks have resided within the brine tanks the required period of time, usually about four to eight hours, the controller operates the outlet gate 52 connecting the cell to the outlet flume 28. The conveyor assembly is indexed to uncover the uppermost row cavity of cheese blocks on the upward run 86 allowing the cheese blocks to float on the surface of the tank. The floating cheese blocks are discharged from the tank 22 through the outlet segment 50 to the outlet flume 28. Motivation flow is provided by a high flow pump plumbed through a manifold with valves controlled by the controller. If new green cheese blocks are available at the time of unloading, loading may occur simultaneously on the downward run as the upward run flights are unloaded. The loading and unloading cycles are then repeated for each cell throughout the day. It will be noted that the entire operation of the cheese brining system 20 may be carried out automatically without manual intervention.

Cheese that has completed the brining sequence travels along the outlet flume 28 and to a discharge conveyor, not shown, which forwards the cheese blocks for processing and packaging.

Each frame 54 has upwardly protruding hooks 88 which may be engaged by an overhead crane 90 for removal of a conveyor assembly 30 from a tank and displacement of the removed assembly to a clean-in-place tank 92. The crane may be a small overhead gantry crane. The clean-in-place tank 92 may be similar in structure to one of the tanks 22, and is provided with internal manifolds to discharge fresh water and cleaning solution onto the conveyor assembly that is disposed therein. The clean-in-place tank 92 is preferably positioned parallel to the other tanks 22.

The far downstream end of the assembly 20 has an exposed maintenance support structure 94 which may also receive from the crane a particular conveyor assembly 30 for convenient access. The maintenance support structure 94 may be as little as elevated brackets supported on vertical beams which support the conveyor assembly in the same fashion as it would be supported within a tank 22, but which allow free access to conveyor assembly for maintenance. To minimize system downtime an additional conveyor assembly 30 may be kept on hand to be substituted into a tank when that tank's conveyor assembly is required to be cleaned or serviced.

A level sensor is provided in the system 20 to allow for makeup brine to be added as cheese blocks are removed from the system, or for brine to be removed as cheese blocks are added to the system.

The system 20 offers a number of advantages: The first cheese block into a tank is the first cheese block out of the tank, making possible consistent residency times. Because of the segregated brining cells, it is a simple matter to treat different batches of cheese differently. Preferably, each cell is sized to accommodate all the cheese blocks from a particular cheese batch. Moreover, this segregation permits the controller to track individual blocks and blocks from a particular vat and to notify packaging equipment of lot and vat identification. The narrow, tall tanks reduce the pumpage required to create high flow rates over the cheese and in the system. Because of the modular brining cells, it is possible to add additional capacity to the system with minimal downtime, since construction on additional tanks can be undertaken while continuing to operate some or all of the original installation, until the time comes to connect the flumes. In addition, if desired, the sump may be omitted, and the entire system may be erected above grade eliminating the need for excavation. Moreover, the system lends itself to modular prefabrication, reducing the construction time on site. Furthermore, because the brine tanks are not within the ground, the possibility of the leakage into the subsoil is minimized. In addition, the system requires less brine than prior art serpentine systems, reducing filtering, pasteurization, and refrigeration requirements. The system provides high storage density, eliminates overhead brine sprays, and thereby keeps the installation floors dry.

If desired, the individual cells may be provided with covers to keep foreign objects out of the brine and to limit contamination of the brine and to protect the room. It should be noted that, although a single belt has been illustrated for each conveyor assembly, the frame may support multiple side by side belts. Moreover, although the frame may be supported entirely from above the belt, structure may be provided in the end walls of the brine tanks to engage with structure on the frame for additional support.

The cheese units treated within the brining assembly of this invention have been referred to herein as cheese blocks. By such term is meant any discrete unit of cheese, of whatever exterior shape, and includes cheese loafs of any size and configuration.

It should be noted that in place of two side-by-side brine tanks 22, as illustrated, a single vessel may be formed with a divider in between which will receive two conveyor assemblies.

Figure 5:
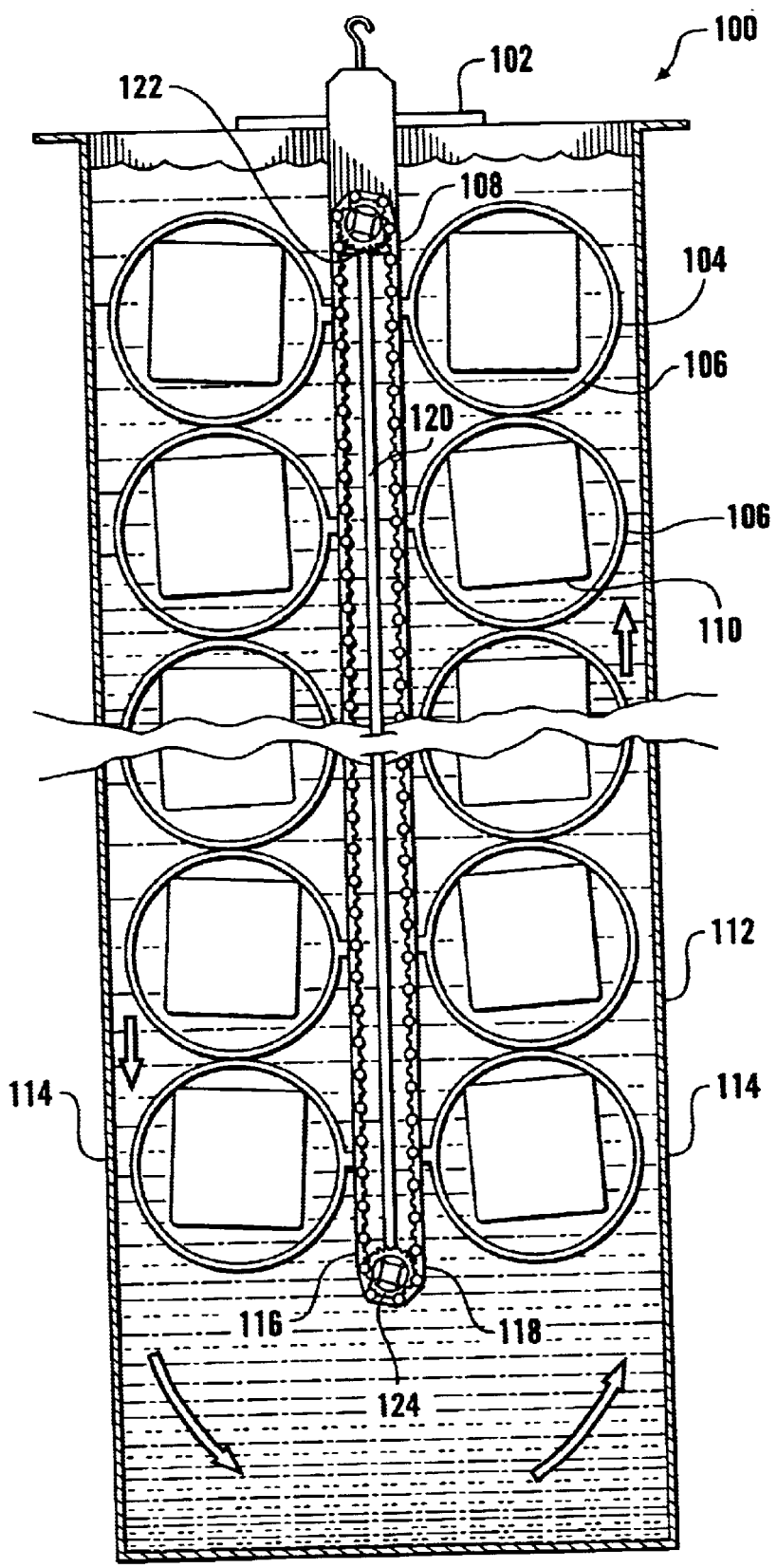
FIG. 5 is a fragmentary cross-sectional view of an alternative embodiment conveyor for the cheese brining system of this invention employing cylindrical tubes.

An alternative embodiment cheese brining system 100, shown in FIG. 5, employs a conveyor assembly 102 having tubular flights 104. The tubular flights 104 may be constant diameter cylindrical tubes 106, formed of PVC or stainless steel, or other USDA approved food grade material. Transparent plastic may be used for the tubes. The tubes 106 are evenly spaced and are fastened to a single belt or to two spaced chains 108. The chains 108 may be formed of plastic. Each tube 106 defines a single row cavity. The ends of the tubes 106 are open and permit the loading and unloading of cheese blocks 110 therein. The diameter of the tubes 106 is selected for the size cheese block to be brined. The cheese blocks may rotate about their long axis, but the diameter is small enough to prohibit the cheese blocks from turning end for end, or from becoming wedged two abreast with a neighboring cheese block. For example, a PVC tube with a diameter of approximately six inches would be adequate for a cheese loaf or block having a square cross section of 4 by 4 inches. An eight inch square cheese block may be accommodated within a tube about ten inches in diameter.

Because the cheese blocks 110 are fully constrained within the tubular flights 104, the tank 112 within which the conveyor 102 is contained may have parallel side walls 114. Other than the parallel sides, the tank 112 and the brine supply system may be as discussed above with respect to the system 20. The downward flights 116 of the chains 108 may be approximately parallel to the upward flights 118, and the chains 108 are supported on a frame 120 which has a single upper sprocket 122 on an axle, and a single lower sprocket 124 on another axle. As in the system 20, the tubular flights are fixed in orientation with respect to the portions of the belt or chains from which they extend. However, because the tubular flights enclose the cheeses contained therein, a cheese will remain engaged by the same tubular flight as it travels through the tank 112. Because of the narrow width of the spacing between the downward flights 116 and the upward flights 118, the frame should be stiffened with an interior truss, not shown, which may use conventional truss bracing. It should be noted that, although cylindrical tubular flights are shown, other tubular shapes may also be employed that are non-round in cross section.

In many cheese brining applications, only cheese blocks of a common size are treated. However, in facilities which produce a wider variety of product, it may be desirable to brine both smaller cheese blocks and larger ones. The embodiments shown in FIGS. 6–8 are cheese brining apparatus of this invention which are readily configurable to different size cheese blocks.

Figure 6:
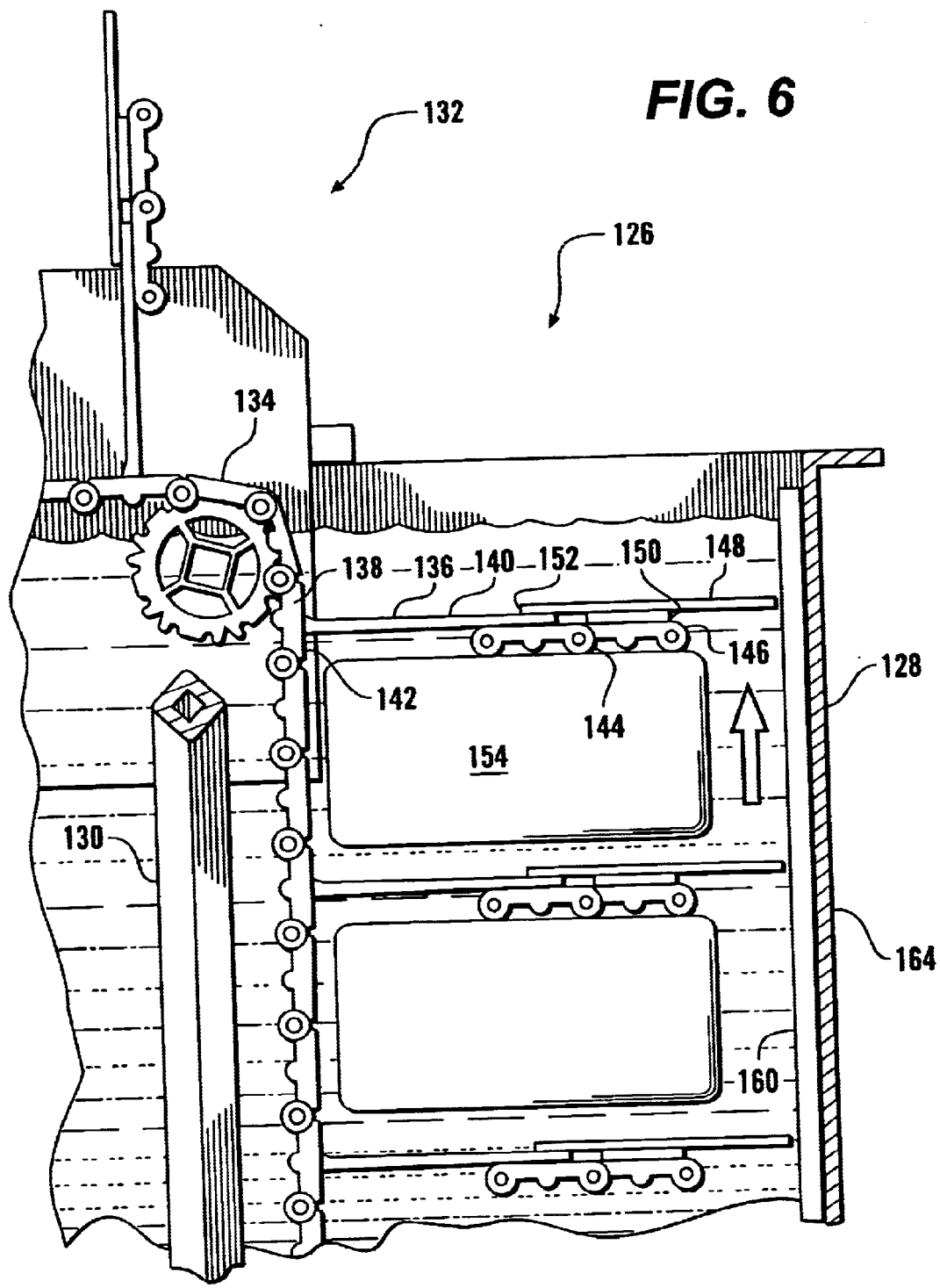
FIG. 6 is a fragmentary cross-sectional view of another alternative embodiment conveyor for the cheese brining system of this invention having pivoting lifts which can accommodate cheese blocks of different size, shown with larger blocks.
Figure 7:
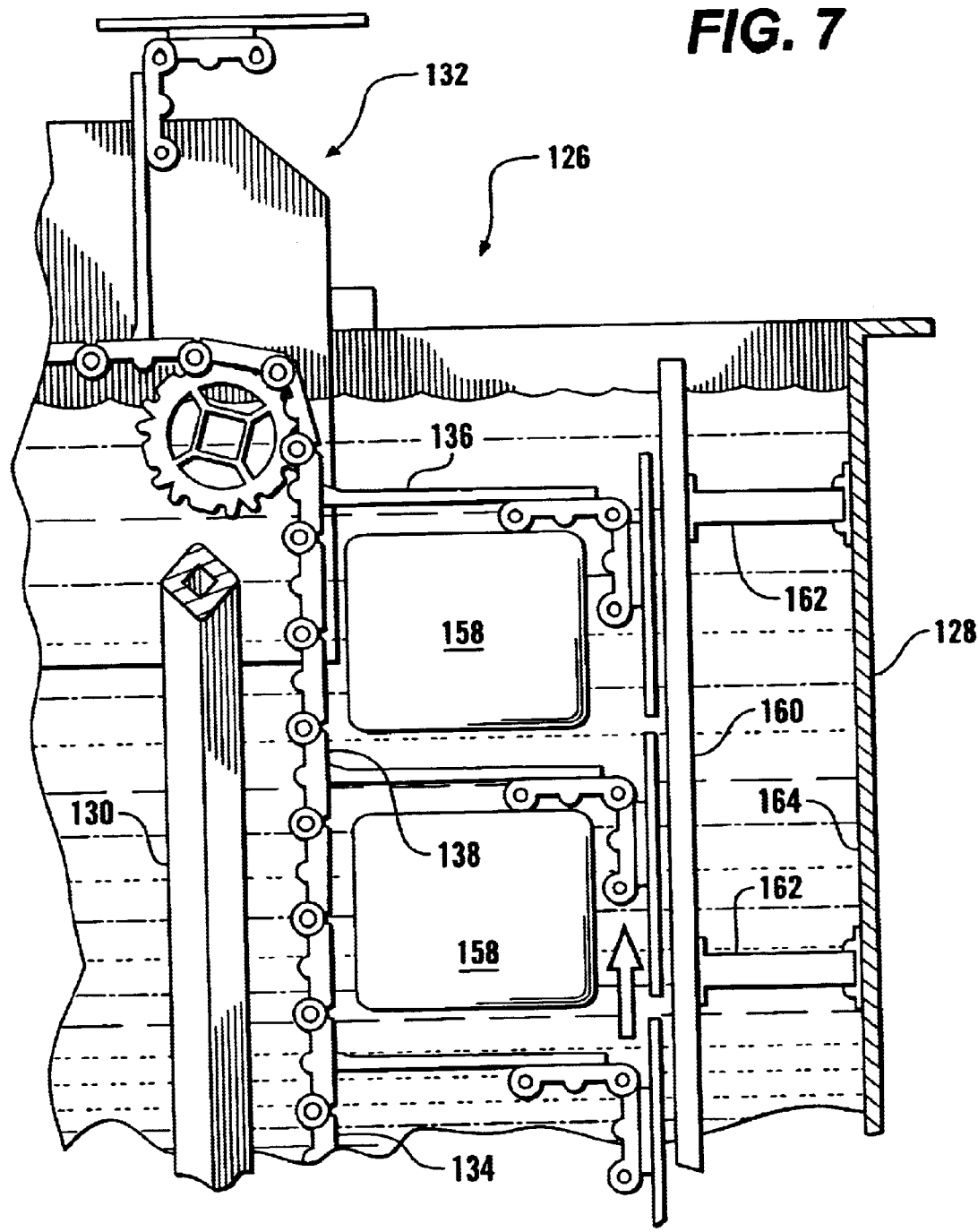
FIG. 7 is a fragmentary cross-sectional view of the conveyor of FIG. 6 shown with smaller blocks.
Figure 8:
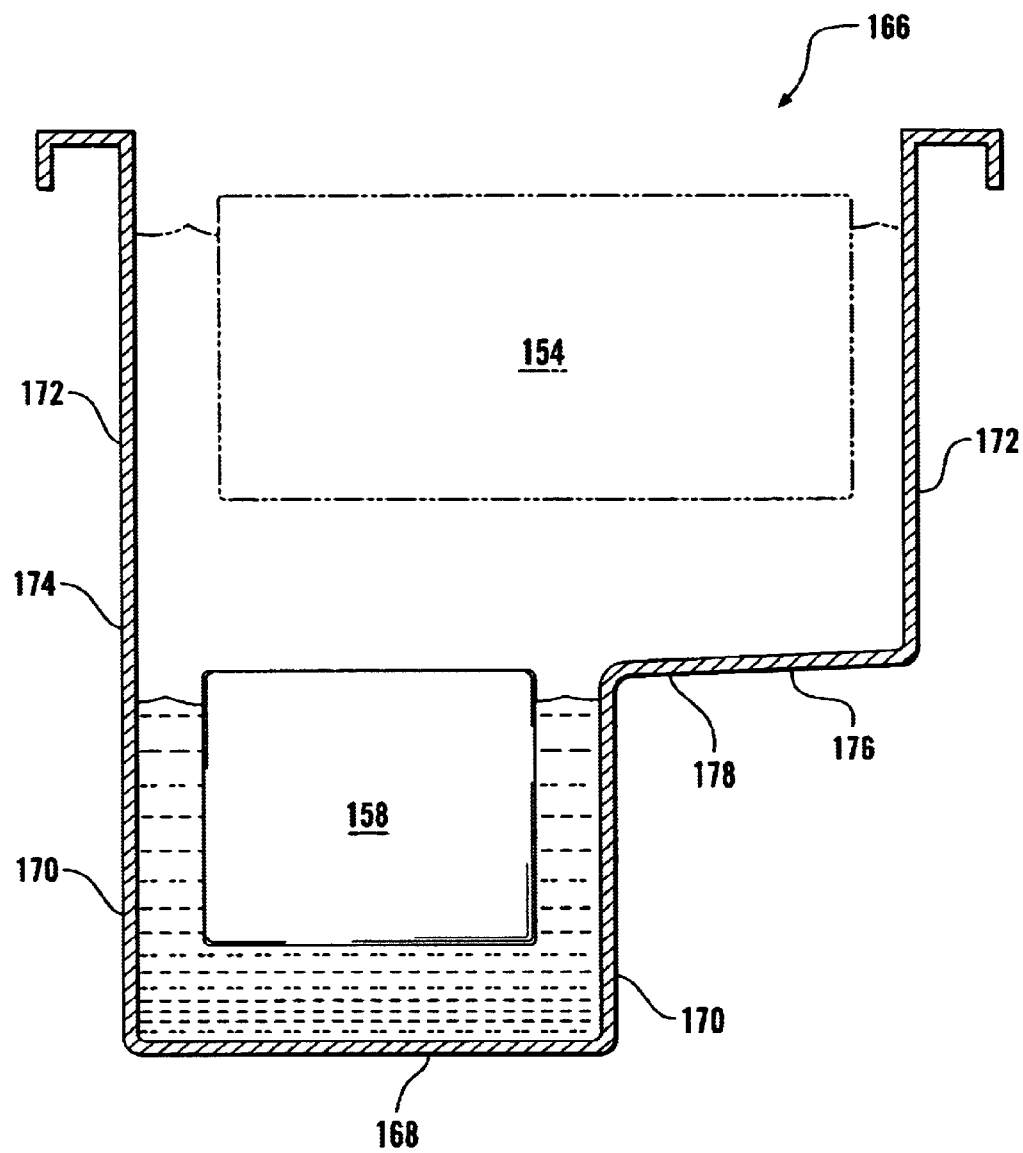
FIG. 8 is a cross sectional view of a flume system which can be readily adapted to smaller cheese blocks by lowering the water level, with larger blocks shown in phantom view with a deeper water level.

The cheese brining assembly 126 shown in FIGS. 6–7 has a tank 128 and conveyor frame 130 generally similar to those shown in FIGS. 1–4. However, the conveyor assembly 132 has a link belt 134 with hinged flights 136 which may assume two different configurations, depending on the size of the cheese blocks to be treated.

As shown in FIG. 6, each flight link 138 has a protruding flight 136 which is comprised of a first segment 140 which is fixed to the link base 142 and which extends about one half the length of the flight 136. The first segment 140 has a series of protruding knuckles 144 which are hingedly pinned to interdigitating knuckles on a knuckle protrusion 146 on a second segment 148. The second segment 148 is connected to the knuckle protrusion 146 by a spacer 150 such that an inside edge 152 of the second segment 148 lies adjacent the first segment 140 when the flight links 138 are configured for use with larger cheese blocks 154. The spacer 150 is approximately the thickness of the first segment 140, to allow the second segment 148 to extend approximately parallel to the first segment.

In operation, when the conveyor assembly 132 is used with larger blocks 154, it operates in much the same way as the conveyor assembly 30. When the flights are moving downwardly within the tank 128 the overlapping first and second segments 140, 148 face the buoyant cheese blocks 154, and the upward force of the cheese block tends to restrain the segments from pivoting with respect to one another. When the flights are moving upwardly within the tank 128, the buoyant cheese blocks 154 engage against the knuckles 144 and knuckle protrusions 146, tending to keep the segments in their extended positions.

If smaller cheese blocks 158 are used in a system with flights providing cavities which are as wide as the blocks are long, there is the possibility for blocks to rotate, and for two blocks to travel abreast. These possibilities are undesirable, as they may result in losing control of the flow of cheese blocks. The conveyor assembly 132 is readily convertible to handle small cheese blocks 158, as shown in FIG. 7. In a second configuration, the second segment 148 of each two-part hinged flight 136 is pivoted to extend approximately perpendicular to the first segment 140. The result is a smaller cavity for the retention of the cheese blocks 158, with the pivoted second segments 148 serving as restraining exterior walls which prevent multiple smaller blocks 158 from traveling abreast one another.

To retain the second segments 148 in their hinged orientation, guides bars 160 are positioned within the tank 128 which extend vertically and prevent the second segments from being pushed away from their perpendicular orientation with respect to the first segments 140. In one arrangement, the guide bars 160 may be mounted on pivoting arms 162 to an exterior wall 164 of the tank. When larger cheese blocks 154 are being treated, the guide bars 160 may be swung against the exterior wall 164 and retained flush with the wall, as shown in FIG. 6. When it is desired to treat smaller cheese blocks 158, the guide bars 160 are swung away from the wall and locked in place as shown in FIG. 7. At least one guide bar 160 may be mounted to both vertical side walls of the tank, and a curved guide bar, not shown, may be positioned along the bottom of the tank where the flights turn from their downward travel to their upward travel. Depending on the length of the tank, two or more parallel guide bars 160 may be mounted on each tank wall. The guide bars 160 may be formed of cylindrical tubes of stainless steel or plastic. For reduced part count in manufacture, the first segment and the second segment may be pivotally joined by conventional links or portions of links, such as are used in the plastic belt from which the flights extend. The links may be bonded or mechanically fastened to each flight segment.

Alternatively, the two segments of each link may be provided with a detent or releasable catch which allows them to be fixed in the perpendicular orientation.

Another concern when using a cheese brining system with blocks of cheese of different size, is that the smaller blocks not become uncontrolled within the brine-carrying flumes which are wide enough to handle the larger cheese blocks. A flume 166 which can be converted for use with larger cheese blocks 154 or smaller cheese blocks 158 is shown in FIG. 8. The flume 166 has a horizontal base wall 168, with upwardly extending first side wall sections 170 which are spaced a first distance apart. This first distance is the appropriate width for conveying smaller cheese blocks. Second side wall sections 172 extend upwardly from the first side wall sections 170, but are spaced a second distance apart which is substantially greater than the first distance spacing of the first side wall sections 170. The second distance is the appropriate width for conveying larger cheese blocks. The flume 166 may have a continuous wall 174 which extends vertically from the base wall 168 and defines both a first side wall section 170 and a second side wall section 172, and a stepped wall 176 which includes a first side wall section 170 extending upwardly from the base wall 168, an intermediate side wall section 178 which extends outwardly from the first side wall section 170, and a second side wall section 172 which extends upwardly from the intermediate side wall section 178. The flume 166 is preferably formed of sheet metal.

When it is desired to employ the flume 166 with larger cheese blocks 154, the flume is filled with brine until there is sufficient volume to float the larger blocks between the second side wall sections 172. When it is desired to employ the flume 166 with smaller cheese blocks 158, the brine level is drained until the brine is fully contained between the first side wall sections 170. The narrower channel defined between the first side wall sections 170 is too narrow to allow the smaller blocks 158 to rotate about a vertical axis, and thus prevents the single file cheese blocks from becoming uncontrolled.

It is understood that the invention is not limited to the particular construction room and arrangement of parts herein illustrated and described, but embraces all such modified forms thereof as come within the scope of the following claims.

We claim:

1. A cheese block transporting flume comprising:
   a base wall;
   first side wall sections which extend upwardly from the base wall and which are spaced a first distance apart of an appropriate width for conveying cheese blocks of a first size; and
   second side wall sections which extend upwardly from the first side wall sections and are spaced a second distance apart which is substantially greater than the first distance spacing of the first side wall sections, the second distance being suited for conveying cheese blocks of a second size which is larger than the first size, such that first size cheese blocks are conveyed when the flume is filled with brine to a level below the second side wall sections, and second size cheese blocks are conveyed when the flume is filled with brine to a level above the first side wall sections.

2. The apparatus of claim 1 wherein one of the first side wall sections is continuous of the second side wall sections to define a continuous wall which extends vertically from the base wall, and a stepped wall includes one of the first side wall section which extends upwardly from the base wall, an intermediate side wall section which extends outwardly from the first side wall section, and a second side wall section which extends upwardly from the intermediate side wall section.

3. The apparatus of claim 1 further comprising:
a tank having a first side wall spaced from a second side wall, the tank defining at least one brining cell and having a fluid inlet and a fluid outlet, the cell having brine therein, and the flume being connected to the fluid inlet;
a frame positioned within the tank;
a looped belt which extends in a continuous path around the frame and which extends into the brine within the tank;
a drive mounted to advance the belt within the cell, and to drive the belt downwardly along a downward run, and then to advance the belt along an upward run as the belt is returned to its original starting location;
a plurality of flights which protrude outwardly from the belt, the flights being positioned to engage floating cheese blocks introduced into the cell at the fluid inlet, and the cheese blocks are positioned by the flights between the belt and the tank first side wall along the downward run, and the cheese blocks are positioned between the belt and the tank second side wall along the upward run, wherein each flight projects away from the belt towards the first wall along the downward run, and each flight projects away from the belt toward the second wall along the upward run.

4. The apparatus of claim 3 wherein the first side wall converges towards the second side wall as the side walls extend towards a bottom wall.

5. The apparatus of claim 4 wherein the belt as it extends along the downward run converges toward the belt extending along the upward run, and wherein the flights are angled downwardly from the horizontal as they are moved along the downward run and the upward run.

6. The apparatus of claim 3 wherein each flight is cylindrical, and cheese blocks are restrained inside the cylindrical flights.

7. The apparatus of claim 3 wherein each flight comprises a first segment fixed to the belt, and a second segment pivotably connected to the first segment, the second segment being pivotable between a first position substantially parallel to the first segment for conveying cheese blocks of a first size, and a second position approximately perpendicular to the first segment for conveying cheese blocks of a second, smaller, size.

8. The apparatus of claim 3 wherein the belt is comprised of a plurality of rigid plastic links which are pinned together, and the flights are formed as portions of selected links.

9. A cheese brining apparatus comprising:
a tank having a first side wall, and an opposed second side wall, with a brining cell defined therebetween and having brine therein;
a frame supported on the tank and having portions which are submerged within the tank;
at least one continuous looped belt mounted to the frame and encircling the frame, the belt having a plurality of cylindrical tubular flights which project outwardly from the at least one belt toward a tank side wall, wherein cheese blocks are engaged within each of said cylindrical tubular flights as the at least one belt is moved in a continuous looped path through the brine within the tank;
a drive mounted to engage the at least one belt to rotate it and to advance cheese blocks submerged within the brine in the tank along said path.

10. A cheese brining apparatus which is adaptable to treating cheese blocks of different dimensions, the apparatus comprising:
a tank having a first side wall, and an opposed second side wall, with a brining cell defined therebeween and having brine therein;
a frame supported on the tank and having portions which are submerged within the tank;
a continuous looped belt mounted to the frame and encircling the frame, the belt having a plurality of hinged segmented flights which project outwardly from the at least one belt away from the frame, wherein cheese blocks are engaged by the hinged segmented flights as the belt is moved in a continuous looped path through the brine within the tank, each hinged segmented flight having a first segment which projects from the belt toward a side wall, and a second segment hinged to the first segment, the second segment being pivotable between a first position lying adjacent the first segment, and positioned to engage a cheese block of a first size, and a second position extending generally perpendicular to the first segment for engaging a cheese block of a second size which is smaller than the first size;
a drive mounted to engage the belt to rotate it and to advance cheese blocks submerged within the brine in the tank along said path.

11. The cheese brining apparatus of claim 10 further comprising at least one guide bar mounted to the tank first side wall and extending vertically within the tank, the at least one guide bar being selectably positionable between a first position which does not engage the second segments, and a second position which retains the second segments in the second position.

12. The cheese brining apparatus of claim 11 wherein the at least one guide bar is mounted on pivoting arms to the first tank side wall.

13. The apparatus of claim 11 wherein the tank has portions defining a fluid inlet, and further comprising a flume connected to the fluid inlet, the flume having a base wall with upwardly extending first side wall sections which are spaced a first distance apart of an appropriate width for conveying the cheese blocks of the first size; and second side wall sections extend upwardly from the first side wall sections and are spaced a second distance apart which is substantially greater than the first distance spacing of the first side wall sections, the second distance being suited for conveying the cheese blocks of a second size which is larger than the first size, such that first size cheese blocks are conveyed when the flume is filled with brine to a level below the second side wall sections, and second size cheese blocks are conveyed when the flume is filled with brine to a level above the first side wall sections.

14. A cheese brining apparatus comprising:
a tank having a fluid inlet, a first side wall, and an opposed second side wall, with a brining cell defined between said side walls, and having brine therein;
a frame supported on the tank and having portions which are submerged within the tank;
at least one continuous looped belt mounted to the frame and encircling the frame, the belt having a plurality of tubular flights which project outwardly from the at least one belt toward a tank side wall, wherein cheese blocks are engaged within each of said tubular flights as the at least one belt is moved in a continuous looped path through the brine within the tank;

a drive mounted to engage the at least one belt to rotate it and to advance cheese blocks submerged within the brine in the tank along said path;

a flume connected to the fluid inlet, the flume having a base wall with upwardly extending first side wall sections which are spaced a first distance apart of an appropriate width for conveying cheese blocks of a first size; and second side wall sections extend upwardly from the first side wall sections and are spaced a second distance apart which is substantially greater than the first distance spacing of the first side wall sections, the second distance being suited for conveying cheese blocks of a second size which is larger than the first size, such that first size cheese blocks are conveyed when the flume is filled with brine to a level below the second side wall sections, and second size cheese blocks are conveyed when the flume is filled with brine to a level above the first side wall sections.

15. The apparatus of claim 14 wherein one of the first side wall sections is continuous with one of the second side wall sections to define a continuous wall which extends upwardly from the base wall, and a stepped wall includes one of the first side wall sections which extends upwardly from the base wall, an intermediate side wall section which extends outwardly from the first side wall section, and a second side wall section which extends upwardly from the intermediate side wall section.

* * * * *